(12) United States Patent
Sasaki et al.

(10) Patent No.: US 6,834,329 B2
(45) Date of Patent: Dec. 21, 2004

(54) CACHE CONTROL METHOD AND CACHE APPARATUS

(75) Inventors: Shigero Sasaki, Tokyo (JP); Atsuhiro Tanaka, Tokyo (JP); Kosuke Tatsukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 239 days.

(21) Appl. No.: 10/190,815

(22) Filed: Jul. 9, 2002

(65) Prior Publication Data

US 2003/0014603 A1 Jan. 16, 2003

(30) Foreign Application Priority Data

Jul. 10, 2001 (JP) .................................. 2001-209153

(51) Int. Cl.[7] .............................................. G06F 12/12
(52) U.S. Cl. ........................ 711/134; 711/136; 711/158
(58) Field of Search ................................ 711/133, 134, 711/136, 159, 160, 118, 158, 130, 149, 170, 171, 172

(56) References Cited

U.S. PATENT DOCUMENTS

| 5,873,100 | A | * | 2/1999 | Adams et al. ............... 707/204 |
| 6,012,126 | A | * | 1/2000 | Aggarwal et al. .......... 711/133 |
| 6,272,598 | B1 | * | 8/2001 | Arlitt et al. ................. 711/133 |
| 6,631,446 | B1 | * | 10/2003 | Cherkauer et al. .......... 711/134 |
| 2002/0120818 | A1 | * | 8/2002 | Hofmann et al. ........... 711/133 |

FOREIGN PATENT DOCUMENTS

JP          11-65927        3/1999

OTHER PUBLICATIONS

L. Cherkasova, "Improving WWW Proxies Performance with Greedy–Dual–Size–Frequency Caching Policy", Computer Systems Laboratory, 14 pages (1998).

E.J. O'Neil et al., "The LRU–K Page Repalcement Algorithm for Database Disk Buffering", Proceedings of the 1993 ACM SIGMOD Int'l Conference on Management of Data, 19 pages (1993).

D. Lee, et al., "On the Existence of a Spectrum of Policies that Subsumes the Least Recently Used (LRU) and Least Frequently Used (LFU) Policies", Proceedings of the 1999 ACM SIGMETRICS Conference on Measurement and Modeling of Computer Systems, pp134–143 (1999).

Y. Smaragdakis, et al., EELRU: Simple and Effective Adaptive Page Replacement, Proceedings of the 1999 ACM SIGMETRICS Conference on Measurement and Modeling of Computer Systems, pp 122–133 (1999).

S. Dan, et al., "A Generalized Interval Caching Policy for Mixed Interactive and Long Video Workloads", Multimedia Computing and Networking, 7 pages (1996).

* cited by examiner

Primary Examiner—Matthew Kim
Assistant Examiner—Shane M. Thomas
(74) Attorney, Agent, or Firm—William, Curtis & Christofferson P.C.

(57) ABSTRACT

A data grouping means divides data items stored in a cache memory section into groups of data having different access patterns. The priority assigning means assigns an order of priorities to data items in each group that the priority assigning means manages according to an individual caching algorithm. The lowest priority determining means determines the lowest priority group when there is not enough unused memory space in the cache memory section and it is necessary to purge a data item. The data operating means purges the lowest priority data in the lowest priority group. Thus the groups of data having different access patterns can be cached effectively.

17 Claims, 11 Drawing Sheets

CACHE CONTROL METHOD AND CACHE APPARATUS

FIELD OF THE INVENTION

The present invention relates to a cache control technique, and more particularly to a technique for selecting data to purge so as to improve cache hit rates.

BACKGROUND OF THE INVENTION

Cache techniques have been increasingly utilized in many scenes as the hierarchization of memories progresses. Besides, with a recent increase in information processing power, a cache miss has come to be one of reasons for deterioration in performance. Thus, the cache techniques have had a great impact on the performance of network systems.

As an outstanding example, there is a proxy cache apparatus which is set in a network such as the Internet and caches data transferred via the network. A cache hit at the proxy cache apparatus shortens a data transfer route, and accordingly, improves data transfer speed. Thus the proxy cache apparatus reduces response time for transferring data.

FIG. 1 is a block diagram showing an example of a network system employing the proxy cache apparatus. As can be seen in FIG. 1, a proxy cache apparatus 4 acts as an intermediary between one or more servers 1-1 to 1-$m$ and one or more clients 2-1 to 2-$n$ via a network (Internet) 3. The proxy cache apparatus 4 receives a request from a client 2-$j$ ($1 \leq j \leq n$) by proxy for a server 1-$i$ ($1 \leq i \leq m$), and sends the request to the server 1-$i$ on behalf of the client 2-$j$. Having received data from the server 1-$i$, the proxy cache apparatus 4 transfers the data to the client 2-$j$. On this occasion, the proxy cache apparatus 4 caches the data. Consequently, when the proxy cache apparatus 4 next receives a request for the same data from a client 2-$k$ ($1 \leq k \leq n$), the data stored in the memory 4 is sent to the client 2-$k$.

As for caching policies employed by cache apparatuses like the proxy cache apparatus 4, there have been proposed a number of caching policies including LRU. One of those policies is described in detail in the technical report: Ludmila Cherkasova, "Improving WWW Proxies Performance with Greedy-Dual-Size-Frequency Caching Policy," Computer Systems Laboratory HPL-98-69 (R.1), November 1998 (hereinafter referred to as reference 1).

Although the theoretically optimum caching policy is to give the lowest priority to data that will be accessed in the most distant future, it cannot be implemented unless all future data accesses are known. Therefore, caching algorithms such as LRU (Least Recently Used) etc. are just approximations of the theoretically optimum algorithm.

Another caching policy is proposed in the paper: E. J. O'Neil, P. E. O'Neil, and G. Weikum, "The LRU-K Page Replacement Algorithm for Database Disk Buffering," in Proceedings of the 1993 ACM SIGMOD International Conference on Management of Data, pp. 297–306, 1993 (hereinafter referred to as reference 2). In the LRU-K method, times of the last K references (K: a positive integer) to respective data items are tracked, and the data item whose Kth most recent reference was made least recently is purged. In the case where K=2, namely, in the case of LRU-2, respective data items are given different priorities depending on whether a reference to the data has been made two or more times. Among the data items to which two or more references have been made, the data item whose second last reference was made least recently are given the lowest priority. Naturally, the data to which only one reference has been made is given lower priority than the data which have been referred to two or more times. When compared with LRU that employs only the last access time as information, the LRU-K algorithm uses access times of last K references as information, and thus the LRU-K is a caching algorithm based on more information than LRU.

In another caching policy called LRFU (Least Recently/Frequently Used) policy, which is described in the paper: D. Lee, J. Choi, J. H. Kim, S. H. Noh, S. L. Min, Y. Cho, and C. S. Kim, "On the Existence of a Spectrum of Policies that Subsumes the Least Recently Used (LRU) and Least Frequently Used (LFU) Policies," in Proceedings of the 1999 ACM SIGMETRICS Conference on Measurement and Modeling of Computer Systems, pp. 134–143, 1999 (hereinafter referred to as reference 3), respective data items are given an ordering of priority based on the CRF (combined Recency and Frequency) value. The CRF value C(t) at time t is determined by a weighing function F(x). Assuming that, for example, current time is 8, and that data was accessed at times 1, 2, 5 and 8, the CRF value C(t) is calculated as follows:

$$C(t)=F(8-1)+F(8-2)+F(8-5)+F(8-8)=F(7)+F(6)+F(3)+F(0).$$

When many references have been made to data, the computation of priority becomes heavy operations and the volume of information to stock increases. However, if the weighing function F(x) has the F(x+y)=F(x)F(y) properties, then C(t) is derived as follows:

$$C(t)=F(8-1)+F(8-2)+F(8-5)+F(8-8)=F(3+5-1)+F(3+5-2)+F(3+5-5)+F(3+5-8)=F(0)+F(3)C(5).$$

Thus, the CRF value can be easily computed from the time of the past reference and the CRF value at that time. Reference 3 indicates that the LRFU policy achieves higher hit rates than the LRU-2 policy does.

There has been proposed yet another caching policy called Early Eviction LRU (EELRU) in the paper: Y. Smaragdakis, S. Kaplan, and P. Wilson, "EELRU: Simple and Effective Adaptive Page Replacement," in Proceedings of the 1999 ACM SIGMETRICS Conference on Measurement and Modeling of Computer Systems, pp. 122–133, 1999 (hereinafter referred to as reference 4). This caching algorithm uses the time of the last reference as information as with LRU. EELRU performs LRU replacement and purges a data item that was least recently accessed unless many data items accessed recently had just been purged. If many data items accessed recently have been purged, the e-th most recently accessed data item is purged from the cache. Additionally, e is dynamically adjusted so as to advance hit rates.

Every algorithm LRU-K, LRFU or EELRU achieves higher hit rates as compared to well-known caching algorithms such as LRU, however, these do not work well for proxy caches. In the caching policy applied to the proxy cache, in many cases, caching and purging of data are performed with respect to each data item requested by the clients. Consequently, when a client requests a large data item and the data item is cached, a number of small ones may be evicted to make space available for storing the large data item. In other words, the usefulness of data depends on the size of the data in addition to access patterns. The GDSF policy (Greedy-Dual-Size-Frequency Caching Policy) described in reference 1 is a caching policy that takes into account the data size. GDSF gives reduced priority to large data and thereby raising hit rates. However, when data of multimedia objects, which is large and read sequentially, is stored in the cache, the data (continuous media data) is given low priority. Therefore, the GDSF policy is not adequate to deal with the continuous media data.

A cache memory section is often composed of a plurality of storage media each having different processing speed and different capacity. A general cache memory section includes a high-speed and low-capacity primary memory and a low-speed and high-capacity secondary memory. When the proxy cache apparatus provided with such memory section deals with large data like continuous media data etc., the data is almost always stored in the secondary memory because the size of the data is too large for the capacity of the primary memory. This means that if traffic concentrates on the continuous media data, the speed at which the data is read out of the low-speed secondary memory creates bottlenecks in the processing. Moreover, since the very large continuous media data is exclusively transferred from the low-speed secondary memory, other data cannot be transferred from the secondary memory where a lot of data items are stored. This problem arises not only when feeding data from the secondary memory into the primary memory, but also when feeding data from a remote host into a local secondary memory.

A caching policy for continuous media data is described in the paper: Asit Dan and Dinkar Sitaram, "A Generalized Interval Caching Policy for Mixed Interactive and Long Video Workloads," Multimedia Computing and Networking, pp. 344–351, 1996 (hereinafter referred to as reference 5). The Generalized Interval Caching (GIC) policy of reference 5 exploits the sequential access to continuous media data. That is, although continuous media data is very large, the whole continuous media data is not requested concurrently, but is broken into parts and the parts are requested one by one from the first at a certain rate. Considering each part of the continuous media data separately, when the first part is requested, then following parts will be sequentially requested in time. Therefore, access times of the following parts can be determined on arrival of the first part. Thus, the parts with more recent access time are given higher priority.

Generally, it is difficult to effectively cache data items each having totally different access patterns such as continuous media data and non-continuous media data. For example, even if separate proxy cache apparatuses are provided for the continuous media data and non-continuous media data, respectively, and both the data are distinguished from one another using a layer 7 switch or the like, the proxy cache apparatuses cannot share computing resources. Therefore, when traffic concentrates on the continuous media data, the proxy cache apparatus for the continuous media data becomes overloaded while there are enough computing resources left in the cache apparatus for the non-continuous media data. Moreover, it is costly to use plural proxy cache apparatuses and a layer 7 switch. It is preferable that both continuous media data and non-continuous media data can be stored in one proxy cache apparatus.

A plurality of caching policies may be applied to a cache system. There is disclosed a method of using different caching policies in Japanese Patent Application laid open No. HEI11-65927, in which existing caching policies such as LRU, LFU and GIC can be used concurrently. With this method, it is possible to prioritize respective data items based on plural policies. However, memory space for each of the caching policies is independent, and there is the case where one caching policy does not have available space while the other does. In such case, data processed by the caching policy having no available memory space cannot be stored even if there is enough space to store the data in the whole memory space. In short, although this method is costly superior to the method of using plural proxy cache apparatuses and a layer 7 switch, computing resources are still not shared. Thus, it is difficult to deal with requests for data that changes dynamically in popularity by the method.

As is described above, there is a problem in the conventional techniques of the references 1 to 5 that data is managed based on one policy, and plural types of data having different access patterns, for example, continuous media data and non-continuous media data cannot be effectively cached. The method described in Japanese Patent Application laid open No. HEI11-65927 solves the problem to some extent. Namely, it is possible to cache each type of data effectively by applying the GIC policy to the continuous media data and the LFU policy to the non-continuous media data.

In the method, however, there are provided individual memory spaces of different policies and each type of data is fixedly allocated to one of them. Consequently, if traffic concentrates on a certain type of data, the memory space for the type of data is led to a deficiency in free space and a purge of data is executed frequently even when other memory space has enough space.

SUMMARY OF THE INVENTION

It is therefore an object of the present invention to obtain high cache hit rates even when multiple types of data are requested and the ratio of requests for each type of data to all requests is dynamically fluctuated by effective allocation of resources.

In accordance with the present invention, to achieve the above object, data items stored in a cache memory section are divided into groups of data each having a different access pattern, and the data items are prioritized within each group by using an individual caching algorithm. When it is needed to purge a data item from the cache memory section, a data item, which is given the lowest priority based on the caching algorithm of its group, is purged from the lowest priority group determined by the prescribed evaluation standards. With this construction, while data are managed in each group based on individual caching algorithms, it is possible to select the lowest priority data item from among all data items in all groups stored in the memory section. In addition, the memory space is not fixedly allocated to each group. Accordingly, even in the case where traffic concentrates on data items in a certain group and there are few accesses to data in the other group, more memory space is available for caching the data of the certain group by reducing the memory space allocated to the other group, and thus realizing higher cache hit rates.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
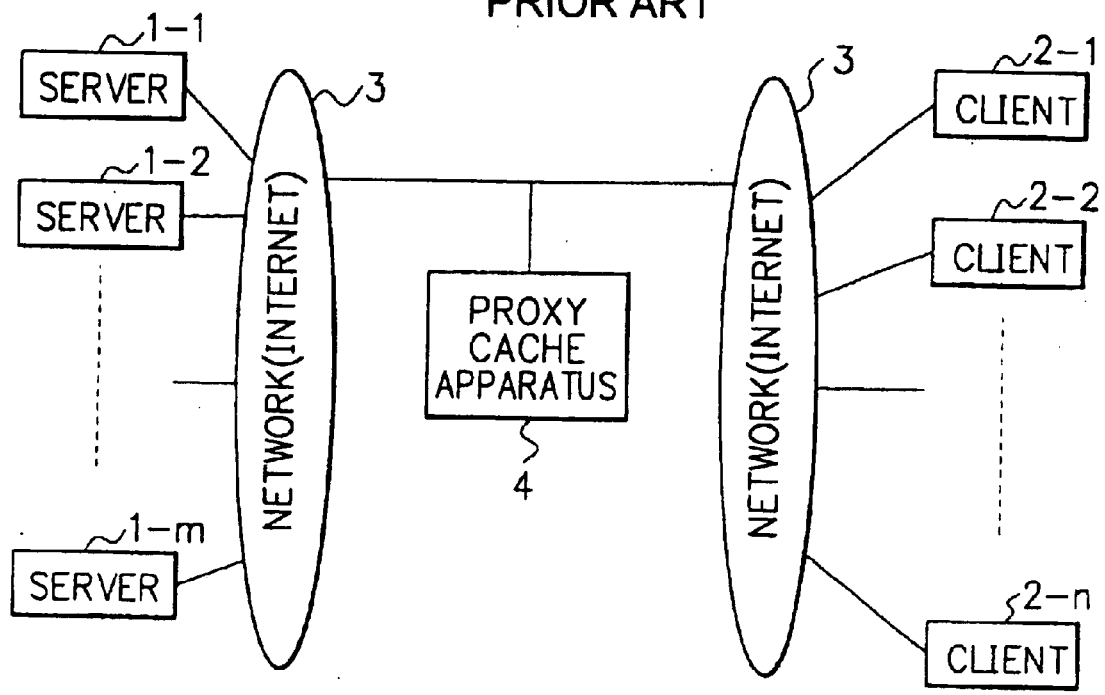
FIG. 1 is a diagram showing an example of a conventional network system using a proxy cache apparatus.

Referring now to the drawings, a description of preferred embodiments of the present invention will be given in detail.

Figure 2:
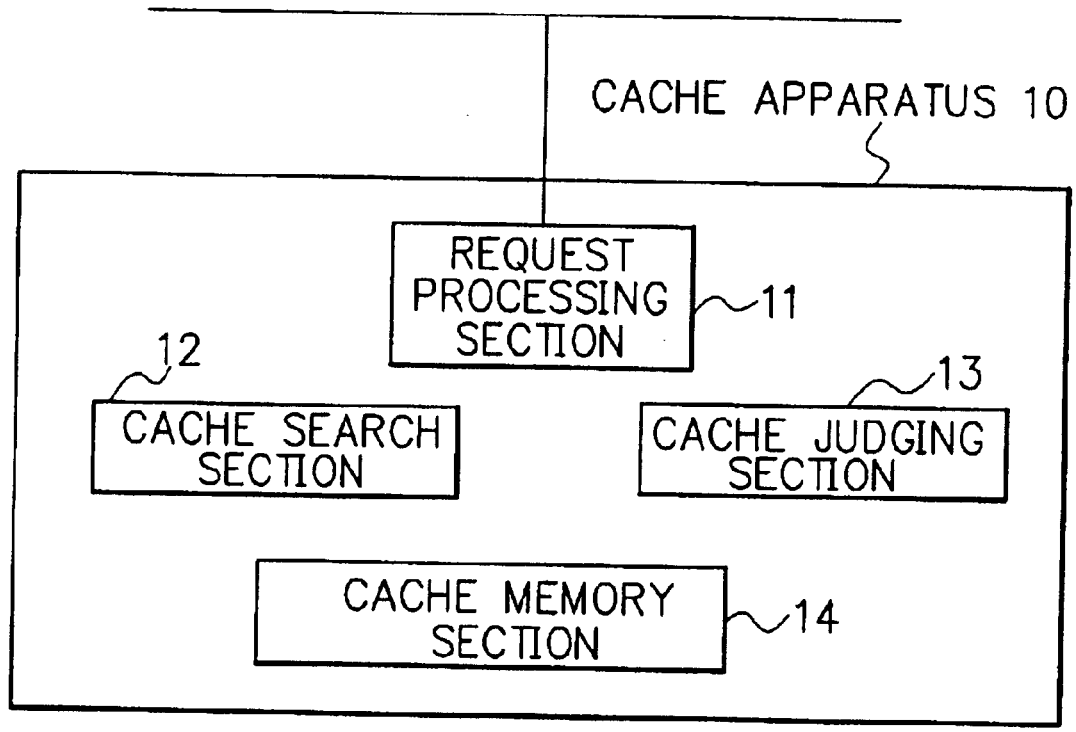
FIG. 2 is a block diagram showing the configuration of a cache apparatus according to the first embodiment of the present invention.

FIG. 2 is a block diagram showing the configuration of a cache apparatus 10 according to the first embodiment of the present invention. As can be seen in FIG. 2, the cache apparatus 10 in this embodiment comprises a request processing section 11 for receiving requests from the outside, a cache memory section 14 for storing data, a cache search section 12 for determining whether or not requested data is present in the cache memory section 14 and reading the data out of the section 14 if the data is present, and a cache judging section 13 for determining whether or not to cache data and storing the data in the cache memory section 14 if the data is determined to be cached, in addition, the section 13 selects data to purge when there is not enough available space in the cache memory section 14.

Figure 3:
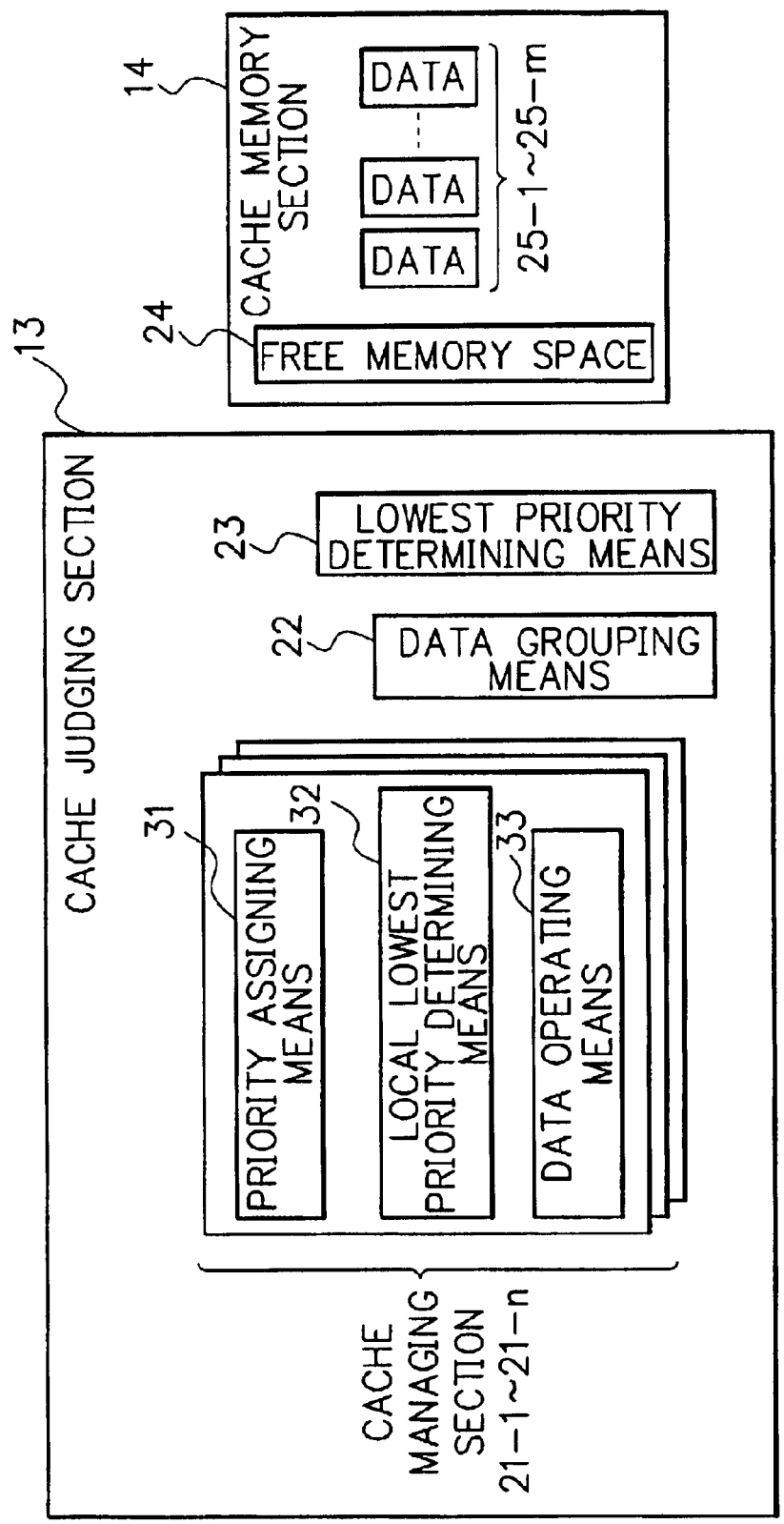
FIG. 3 is a block diagram showing the configuration of a cache judging section and a cache memory section in the cache apparatus of FIG. 2.

FIG. 3 is a block diagram showing the configuration of the cache judging section 13 and the cache memory section 14 depicted in FIG. 2. The cache judging section 13 includes a plurality of cache managing sections 21-1 to 21-n, a data grouping means 22 and a lowest priority determining means 23.

The data grouping means 22 allocates data items 25-1 to 25-m to be stored in the cache memory section 14 to the cache managing sections 21-1 to 21-n according to predetermined grouping rules. A group of data items managed by one cache managing section is hereinafter referred to as a data group. Each of the data items 25-1 to 25-m has the same size and belongs to one of the data groups.

The cache managing sections 21-1 to 21-n, each having a priority assigning means 31, a local lowest priority determining means 32 and a data operating means 33, manage the data groups based on individual caching algorithms. The priority assigning means 31 provided in the cache managing section 21-i (1≦i≦n) assigns an ordering of priorities to respective data items in the data group managed by the section 21-i according to the caching algorithm employed in the section 21-i. The local lowest priority determining means 32 provided in the cache managing section 21-i specifies a data item with the lowest priority in the data group managed by the section 21-i. The data operating means 33 executes data caching/purging operation.

The lowest priority determining means 23 specifies a data group with the lowest priority from among data groups managed by the cache managing sections 21-1 to 21-n. The data operating means 33 of the cache managing section that manages the lowest priority data group purges the lowest priority data item in the data group when there is not enough free memory space 24 in the cache memory section 14.

Figure 4:
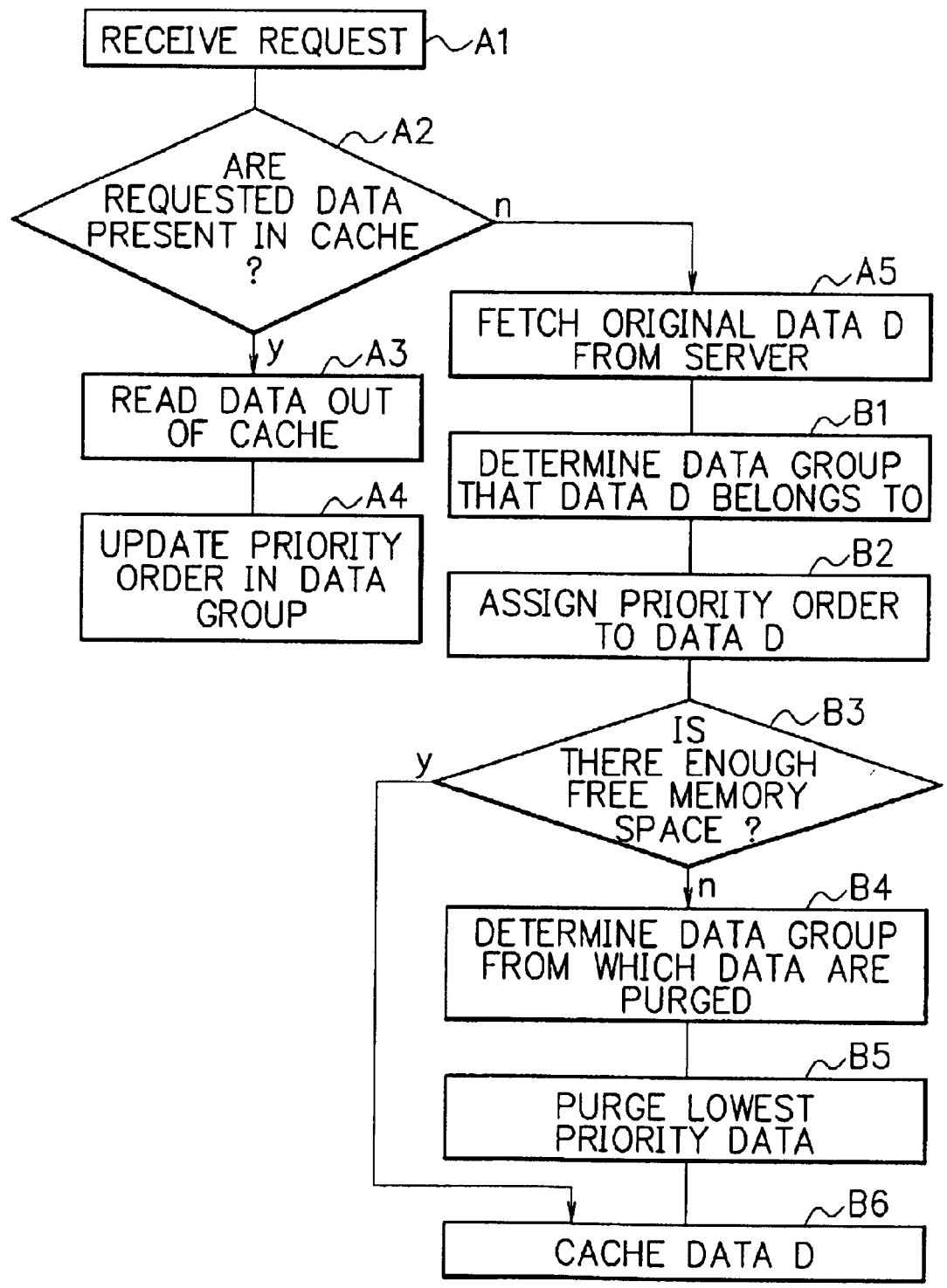
FIG. 4 is a flowchart for explaining an example of operation according to the first embodiment.

Referring next to FIGS. 2, 3 and 4, the caching operation of the first embodiment will be explained.

FIG. 4 is a flowchart showing an example of operation when the request processing section 11 receives a request from the outside.

When a request is received by the request processing section 11 (FIG. 4, step A1), the cache search section 12 finds out whether or not the requested data is present in the cache memory section 14 (step A2).

If the data is present, the cache search section 12 reads the data out of the cache memory section 14 (step A3). Besides, the priority assigning means 31, which is provided in the cache managing section 21-i that manages the data, updates the ordering of priorities for data items in the data group managed by the section 21-i (step A4). The update of priority is executed according to the caching algorithm employed in the cache managing section 21-i. For example, if LFU is used in the section 21-i, reference frequency count of the data is incremented by 1. On the other hand, if the data is not in the section 14, the cache search section 12 fetches original data D from an original server (step A5).

Next, the data grouping means 22 in the cache judging section 13 determines a data group to which the data D belongs (step B1), and the priority assigning means 31, which is provided in the cache managing section 21-j that manages the data group, assigns an order of priority to the data D (step B2). Subsequently, it is determined whether or not there is enough free memory space 24 for storing the data D (step B3). If there is enough space 24, the operation proceeds to step B6, and if not, the lowest priority determining means 23 determines a data group (the lowest priority data group), from which data is purged, from among all data groups based on the prescribed evaluation standards (step B4). After the lowest priority data group is determined at step B4, the data operating means 33 provided in the cache managing section 21-k (1≦k≦n) that manages the data group adds the memory space, which the lowest priority data specified by the local lowest priority determining means 32 has occupied, to the free memory space 24 to obtain enough space for storing the data D (step B5). Then, the data operating means 33 stores the data D in the free memory space 24 (step B6). Incidentally, while in this embodiment the data items 25-1 to 25-m have the same size, the data items may have different sizes as well. In the case where the data items are of unequal size, the operation at steps B4 and B5 are repeated until the free memory space 24 becomes sufficient to store the data D.

Figure 5:
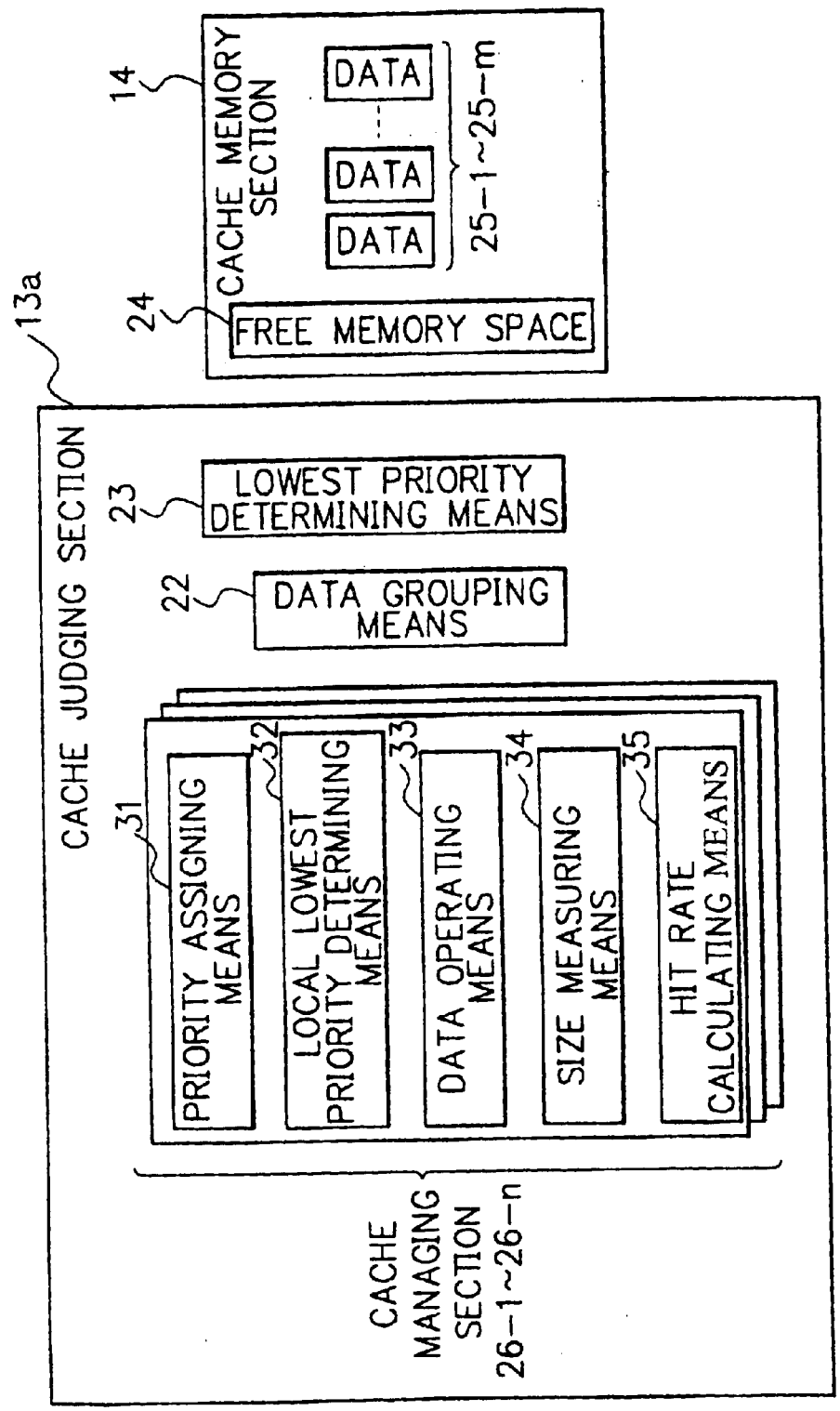
FIG. 5 is a block diagram showing the configuration of a cache judging section and a cache memory section in a cache apparatus according to the second embodiment of the present invention.

In the following, a detailed description will be given of the second embodiment of the present invention with reference to the drawings. The cache apparatus according to the second embodiment is implemented with the use of a cache judging section 13a depicted in FIG. 5 instead of the cache judging section 13 in FIG. 3. This embodiment differs from the first embodiment in that the cache judging section 13a is provided with cache managing sections 26-1 to 26-n instead of the cache managing sections 21-1 to 21-n. Each of the cache managing sections 26-1 to 26-n includes a size measuring means 34 and a hit rate calculating means 35 in addition to the configuration of the cache managing sections 21-1 to 21-n in the first embodiment. The size measuring means 34 in the cache managing section 26-i (1≦i≦n)

measures the size of memory space occupied by the data group managed by the section 26-*i*. The hit rate calculating means 35 in the cache managing section 26-*i* calculates a cache hit rate for the data group managed by the section 26-*i*.

Figure 6:
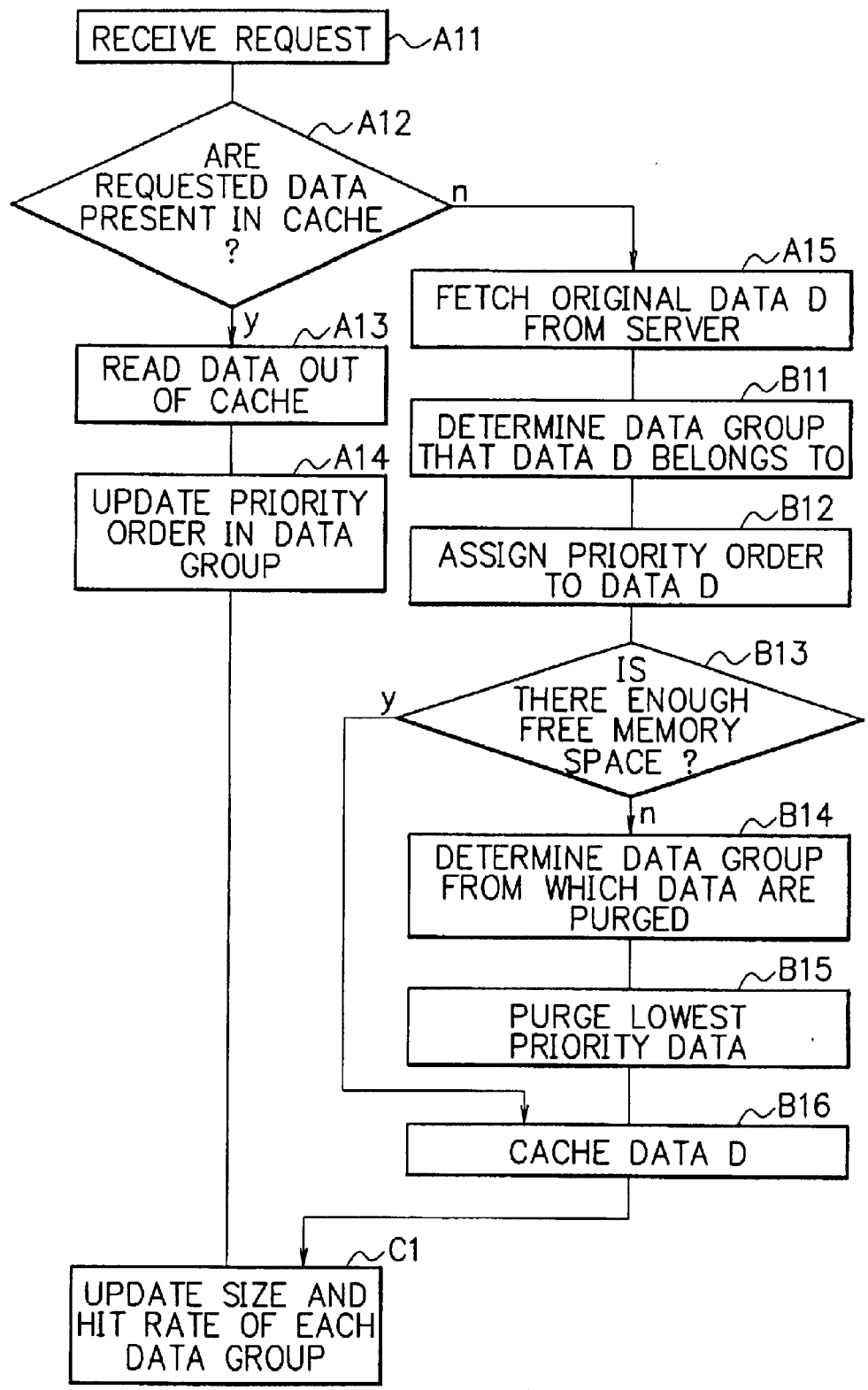
FIG. 6 is a flowchart for explaining an example of operation according to the second embodiment.

Referring next to FIG. 6, the caching operation of this embodiment will be explained.

FIG. 6 is a flowchart showing an example of operation on arrival of a request according to the second embodiment of the present invention. The operation at steps A11 to A15 and B11 to B16 in FIG. 6 is the same as steps A1 to A5 and B1 and B6 described previously for the first embodiment in connection with FIG. 4, and therefore does not require any further explanation.

In the first embodiment, parameters that are used at step B4 for selecting a data group is not concretely specified. In this embodiment, the size measuring means 34 and the hit rate calculating means 35 provided in each of the cache managing sections 26-1 to 26-*n* find out the size of memory space occupied by each data group and a cache hit rate, and a data group from which data is purged is determined by using those values as parameters (step B14). To be more specific, the proportion of hit rate to the size of memory space occupied by each data group (cache hit rate/size) is obtained, and data is purged from a data group with the smallest value. After caching data, the size of memory space and hit rate for the data group are updated (step C1).

In this embodiment, utility of data groups is evaluated (a data group from which data is purged is determined) in consideration of the size of memory spaces used by the data groups and cache hit rates, and thereby enabling the better judgment on the data that should be purged as compared with caching strategies taking no account of characteristics of the whole data group. Thus, it is possible to improve cache hit rates.

In the following, the first mode of operation according to the first embodiment of the present invention will be explained. In the first mode of operation, the cache apparatus 10 depicted in FIG. 2 is used as a proxy cache apparatus for caching WWW (World Wide Web) data.

In this mode of operation, data is divided into fractions each having prescribed size (for example, 4096 bytes) and cached or purged with respect to each of the fractions. A client requests the cache apparatus 10 to transmit the fractions of data (divided data items) sequentially from the first one. It is uncertain if the divided data item including a header (the first divided data item) will be requested or not. However, when a request for the first divided data item is received, then it is decided that the following divided data items (second and after the second divided data items) will be requested. Clearly, this mode may be applied to the case where data is divided into various lengths (for example, divided at A1st byte from the header, at A2nd byte therefrom, and so forth).

The caching operation of this mode is performed as follows. When the request processing section 11 receives a request (a request for sequential transmission of divided data items of data α from the first one) from a client (FIG. 4, step A1), the cache search section 12 finds out whether or not the first divided data item including the header of the data α is present in the cache memory section 14 (step A2).

If the first divided data item is not stored in the section 14, the cache search section 12 fetches the original first divided data item from a server (step A5). After that, the data grouping means 22 in the cache judging section 13 determines a data group to which the first divided data item belongs (step B1).

Incidentally, the data grouping means 22 classifies a divided data item whose access time is unpredictable into a data group X, and divided a data item whose access time is predictable in a data group Y. More specifically, the data grouping means 22 classifies the first divided data item into the data group X. As for the divided data items following the first one, the data grouping means 22 classifies a divided data item into the data group Y when there is a request for the data including the divided data item in the following requests that the request processing section 11 has been receiving, or otherwise classifies a divided data item into the data group X. Incidentally, divided data items belonging to the data group X are managed by the cache managing section 21-1, and divided data items belonging to the data group Y are managed by the cache managing section 21-2 in this embodiment.

When the first divided data item is classified into the data group X at step B1, the priority assigning means 31 provided in the cache managing section 21-1 assigns an order of priority to the first divided data item based on LFU, namely, based on the reference frequency count (step B2). While in this example, the priority assigning means 31 provided in the cache managing section 21-1 assigns an order of priority since the first divided data belongs to the data group X, the priority assigning means provided in the cache managing section 21-2, which manages the data group Y, assigns an order of priority when the divided data item is classified into the data group Y at step B1. The priority assigning means 31 provided in the cache managing section 21-2 assigns an order of priority based on expected access time. The expected access time is derived from expected rate of data transfer from the client to the proxy cache apparatus and the size of the divided data item. It is also necessary to take account of the number of divided data items between divided data items that have been accessed and the object data item for which access time is calculated. For example, assuming that the expected transfer rate is constantly 1 megabit per second and the size of the respective divided data items is uniformly 256 kilobytes, it takes 2 seconds to transfer a divided data item. Thereby the expected access time can be derived by multiplying 2 by the above-mentioned number of divided data items. That is, the expected access time is calculated as follows: "expected access time=current time+size of divided data×R/data transfer rate". In the above expression, R represents the number of divided data items between divided data items that have been accessed and the object data item for which access time is calculated.

After that, it is determined whether or not there is enough free memory space 24 for storing the first divided data item (step B3). If there is enough space 24, the first divided data item is stored in the cache memory section 14 by the data operating means 33 provided in the cache managing section 21-1 (step B6). If there is not enough space 24, the lowest priority determining means 23 compares the priority of the data group X and the data group Y, and determines a data group from which a data item is purged (step B4).

Further details of the operation at step B4 will be described. The lowest priority determining means 23 compares the priority of the data group X and the data group Y by comparing the expected access time of the lowest priority data item in the data group X with the priority (expected access time) assigned to the lowest priority data item in the group Y. The expected access time for the lowest priority data item in the data group X is derived from current time and the reference frequency count. The function for changing the priority derived from the reference frequency count into the expected access time is expressed as: "expected access time=C+k/(f+1)". Incidentally, C represents current time, f represents the reference frequency count of a candidate data item for purge, and k represents a constant. In the case of employing a caching algorithm other than LFU for processing the data group X, the priority is changed into expected access time by a function depending on a parameter(s) of information adopted by the caching algorithm.

After a data group subject to a purge is determined at step B4, the data operating means 33 provided in the cache managing section that manages the data group adds the memory space, which the lowest priority data item specified by the local lowest priority determining means 32 has occupied, to the free memory space and stores the first divided data item therein (step B5, B6). A heap is adopted in the local lowest priority determining means 32.

In the above description, the operation in the case where the first divided data item of the data α is not present in the cache memory has been explained. Next, a description will be given of the operation when the data item is present in the cache memory.

When it is determined that the first divided data item of the data α is present in the cache memory section 14 at step A2, the cache search section 12 reads the first divided data item out of the cache memory section 14 (step A3). Subsequently, the ordering of priorities for data items following the first divided data item of the data α is updated (step A4).

Further details of the operation at step A4 will be described. The data grouping means 22 instructs the cache managing section 21-1 that manages divided data items belonging to the data group X to remove controls from the divided data items following the first divided data item and instructs the cache managing section 21-2 that manages divided data items belonging to the data group Y to manage the data items following the first divided data item. Thereby the cache managing section 21-1 removes controls from the data items following the first divided data item of the data α if the data items have been under the control of the section 21-1. On the other hand, the cache managing section 21-2 manages the data items following the first divided data item if the data items have not been under the control of the cache managing section 21-2. After that, the priority assigning means 31 provided in the cache managing section 21-2 updates the ordering of priorities (expected access time) for the data items following the first divided data item. The ordering of priorities is updated by calculating the expected access times for the respective data items based on the above-mentioned expression: "expected access time=current time+size of divided data×R/data transfer rate", and assigning the obtained expected access time to the corresponding data item. Besides, the priority assigning means 31 provided in the cache managing section 21-1 updates the order of priority (reference frequency count) for the first divided data item of the data α.

The data items of the data α are processed sequentially, and after the last divided data item of the data α is processed, the data grouping means 22 finds out whether or not there is a request for the data α in the following requests that the request processing section 11 has been receiving. If not, the data grouping means 22 instructs the cache managing section 21-1 to manage the data items following the first divided data item of the data α and instructs the cache managing section 21-2 to remove controls from the data items following the first divided data item. Thereby the cache managing section 21-1 manages the data items following the first divided data item, and the cache managing section 21-2 removes controls from the data items following the first divided data item. After that, the priority assigning means 31 provided in the cache managing section 21-1 assigns the same order of priority (reference frequency count) as assigned to the first divided data item to the data items following the first divided data item.

A description will be given of a variation on the first mode of operation according to the first embodiment of the present invention. In this variation, the first embodiment of the present invention is applied to a disk cache apparatus for caching data stored in a secondary memory into a primary memory.

Figure 7:
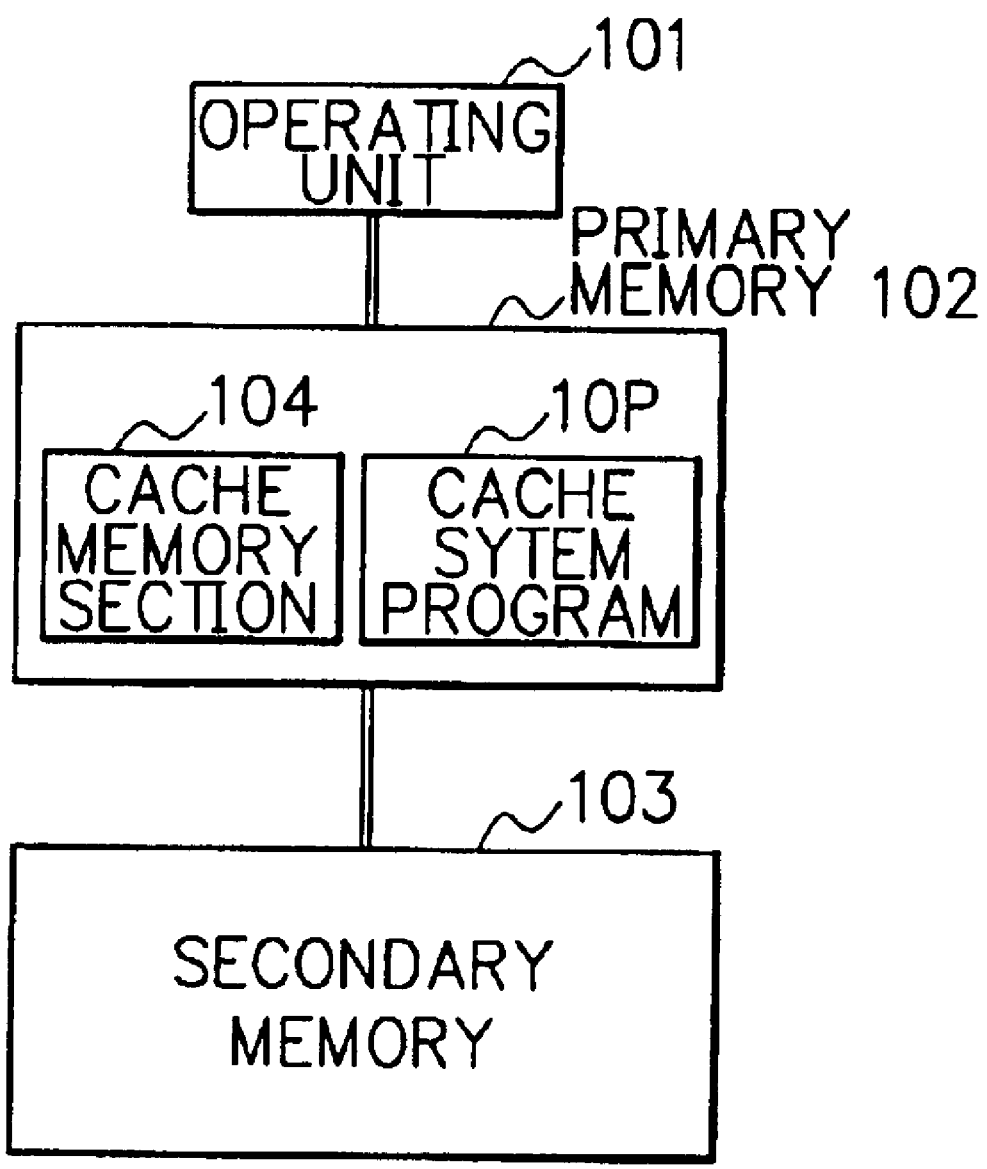
FIG. 7 is a block diagram for illustrating the first mode of operation according to the first embodiment.

Referring to FIG. 7, the cache apparatus 10 of the present invention is adopted in a system comprising an operating unit 101, a primary memory 102 including a cache memory section 104 and a secondary memory 103. Additionally, the primary memory 102 further includes a cache system program 10P for implementing the components of the cache apparatus 10 depicted in FIG. 2, namely, the request processing section 11, the cache search section 12 and the cache judging section 13. The cache system program 10P is read by the operating unit 101, and controls the operation of the unit 101 to implement the request processing section 11, the cache search section 12 and the cache judging section 13 in the operating unit 101. The cache memory section 104 included in the primary memory 102 is equivalent to the cache memory section 14 shown in FIG. 2.

Assuming that continuous media data or video objects that are very large and read sequentially are stored in the secondary memory 103, the access to the large data occupies the bands used for reading data out of the secondary memory 103 for a long time. Consequently, if there are many requests for the large sized data such as the continuous media data, the speed at which the data is read out of the low-speed secondary memory creates bottlenecks in the processing and the rate of data transfer is drastically reduced. Therefore, a data item to purge is selected so that data is stored in and read out of the high-speed primary memory by exploiting characteristics of the large sized data such as continuous media data.

Data is divided into units of input and output of the secondary memory 103, and a cache/purge is performed with respect to each divided data item. For example, assuming that the secondary memory 103 outputs/inputs data by 4096 bytes, data is divided into 4096-byte data items from the head, and the 4096-byte data is defined as a unit of cache/purge.

In the following, the caching operation of this variation will be explained.

When the request processing section 11 implemented by the cache system program 10P receives a request (a request for sequential transmission of divided data items of data α from the first one) from the operating unit 101 (FIG. 4, step A1), the divided data items of the data α are sequentially processed from the first divided data item in the same manner as described previously. For example, when the n-th divided data item of the data α is processed, the cache search section 12 implemented by the cache system program 10P finds out whether or not the n-th divided data item of the data α is present in the cache memory section 104 (step A2).

When the n-th divided data item is not in the section 104, the cache search section 12 fetches the original n-th divided data item from the secondary memory 103 (step A5). After that, the data grouping means 22 included in the cache judging section 13 implemented by the cache system program 10P determines a data group to which the n-th divided data item belongs (step B1). The operation at step B1 is performed in the same manner as described previously, and the n-th divided data item is classified into the data group X for the data whose access time is unpredictable, or the data group Y for the data whose access time is predictable.

Next, the order of priority is assigned to the n-th divided data item (step B2). If the n-th divided data item belongs to the data group X, the order of priority is assigned based on the reference frequency count, while if the n-th data item belongs to the data group Y, based on expected access time. The expected access time is calculated as follows: "expected access time=current time+size of divided data×R/data transfer rate between the operating unit 101 and the primary memory 102". In the above expression, R represents the number of divided data items between data items that have been accessed and the object data item for which access time is calculated.

Subsequently, it is determined whether or not there is enough free memory space for storing the n-th divided data item in the cache memory section 104 (step B3). If there is enough space, the data operating means 33 provided in the cache managing section 21-1 or 21-2 caches the n-th divided data item in the cache memory section 104 (step B6). If not, the lowest priority determining means 23 compares the priority of the data group X and the data group Y, and determines the data group from which a data item is purged (step B4). The operation at step B4 is quite the same as described previously.

When the data group subject to a purge is determined at step B4, the data operating means 33, which is provided in the cache managing section that manages the data group, purges the lowest priority data item specified by the local lowest priority determining means 32. Then, the data operating means 33 adds the memory space, which the lowest priority data item has occupied, to the free memory space and caches the n-th divided data item therein (step B5, B6).

In the above description, the operation in the case where the n-th divided data item of the data α is not present in the cache memory section 104 has been explained. Next, a description will be given of the operation when the data item is present in the cache memory.

When it is determined that the n-th divided data item is present in the cache memory section 104 at step A2, the cache search section 12 reads the n-th divided data item out of the cache memory section 104 (step A3). Subsequently, the ordering of priorities for subsequent data items from the (n+1)th data item of the data α is updated (step A4). The operation at step A4 is quite the same as described previously.

The above operation is repeated until the last divided data item of the data α is processed. Then, the data grouping means 22 finds out whether or not there is a request for the data α in the following requests that the request processing section 11 has been receiving. If not, the data grouping means 22 instructs the cache managing section 21-1 that manages divided data items belonging to the data group X to manage the data items following the first divided data item, and instructs the cache managing section 21-2 that manages divided data items belonging to the data group Y to remove controls from the data items following the first divided data item. Thereby the cache managing section 21-1 manages the data items following the first divided data item, and the cache managing section 21-2 removes controls from the data items following the first divided data item. After that, the priority assigning means 31 provided in the cache managing section 21-1 assigns the same order of priority (reference frequency count) as assigned to the first divided data item to the data items following the first divided data item. Incidentally, the above-described first mode of operation according to the first embodiment and the variation thereon may be applied to the second embodiment.

In the following, the second mode of operation according to the first embodiment of the present invention will be explained. In the second mode of operation, the cache apparatus of the first embodiment is used as a disk cache apparatus in a system wherein a secondary memory stores two kinds of information: directory data and file data.

In this mode of operation, the directory data and the file data are cached based on LFU, and each data item is given an order of priority according to the reference frequency count. In addition, the last access time of the data item is used for determining the lowest priority data group. That is, the lowest priority data group is determined by comparing the last access times of the local lowest priority data items (data items with the least reference frequency count) in respective data groups. One of the local lowest priority data items, whose last access was made less recently, is defined as the lowest priority data item.

Figure 8:
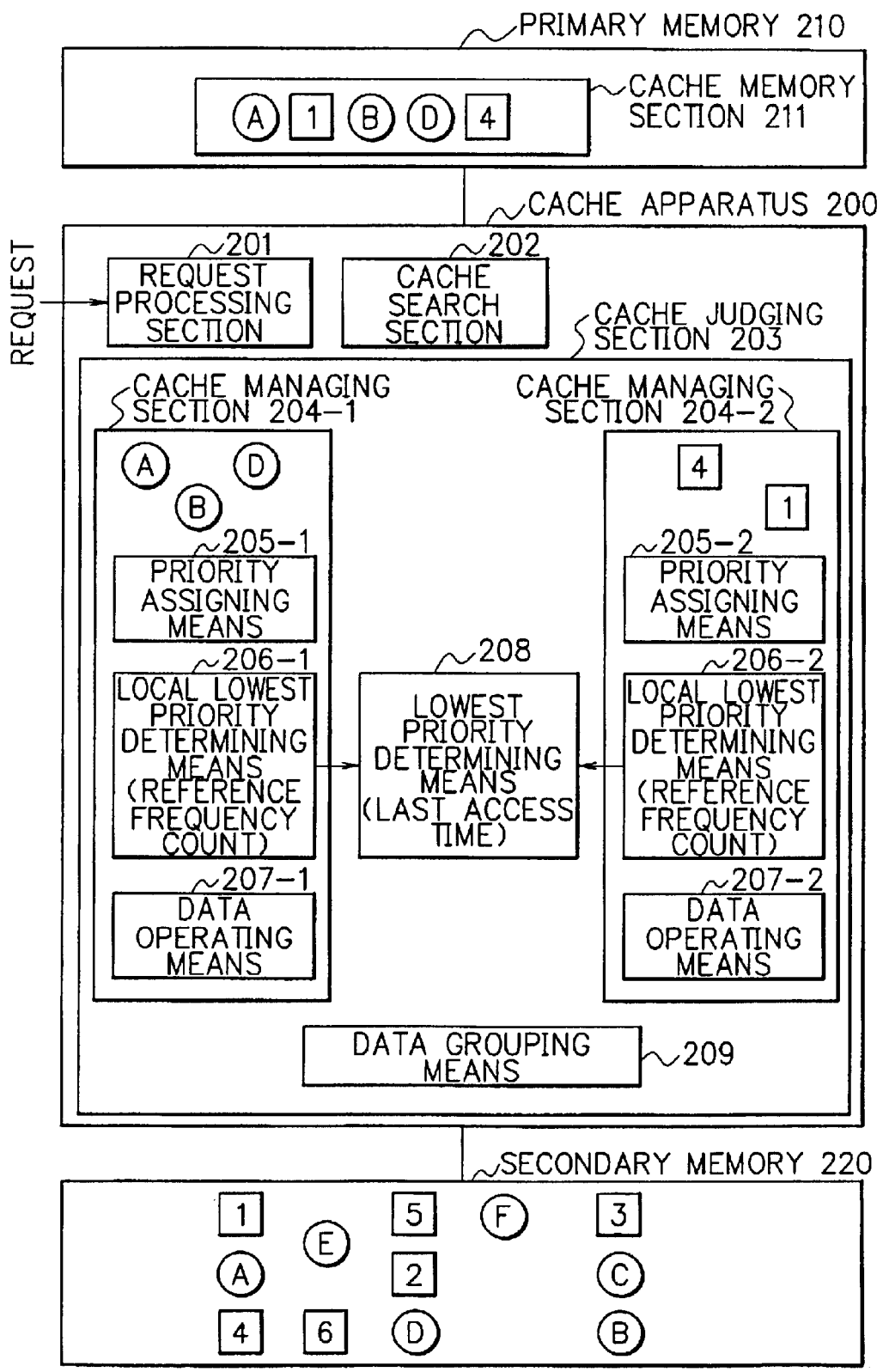
FIG. 8 is a block diagram for illustrating the second mode of operation according to the first embodiment.

FIG. 8 is a block diagram illustrating a system to which the second mode of operation according to the first embodiment is applied. Referring to FIG. 8, the cache system comprises a cache apparatus 200, a primary memory 210 and a secondary memory 220.

The primary memory 210 includes a cache memory section 211. The secondary memory 220 stores a plurality of directory data items A to F and a plurality of file data items 1 to 6.

The cache apparatus 200 is provided with a request processing section 201, a cache search section 202 and a cache judging section 203. The request processing section 201 and the cache search section 202 function in the same manner as the request processing section 11 and the cache search section 12 shown in FIG. 2. The cache judging section 203 includes a cache managing section 204-1 for managing the directory data, a cache managing section 204-2 for managing the file data, a lowest priority determining means 208, and a data grouping means 209.

When the request processing section 201 receives a request from the outside (FIG. 4, step A1), the cache search section 202 finds out whether or not the requested data is present in the cache memory section 211 (step A2).

If the data is present, the cache search section 202 reads the data out of the cache memory section 211 (step A3). Subsequently, a priority assigning means 205-i (i=1 or 2), which is provided in the cache managing section 204-i (i=1 or 2) that manages the requested data, updates the reference frequency count (priority) and last access time of the data (step A4). On the other hand, if the data is not in the section 211, the cache search section 202 fetches the requested data from the secondary memory 220 (step A5).

Next, the data grouping means 209 included in the cache judging section 203 determines a data group to which the requested data belongs (step B1). In this example, the directory data belongs to a data group G1 managed by the cache managing section 204-1 and the file data belongs to a data group G2 managed by the cache managing section 204-2.

Following the above operation, the priority assigning means 205-i (i=1 or 2) provided in the cache managing section 204-i (i=1 or 2) assigns a reference frequency count (priority) and last access time to the data (step B2). Then, it is determined whether or not there is enough free memory space in the cache memory section 211 for storing the data (step B3). If there is enough space, the data is stored in the cache memory section 211 (step B6). If not, the lowest priority determining means 208 compares the last access times of the local lowest priority data items (data items with the least reference frequency count) in the data groups G1 and G2 specified by local lowest priority determining means 206-1 and 206-2, and determines to purge one of the local lowest priority data items, whose last access was made less recently (step B4).

After that, a data operating means 207-$i$ (i=1 or 2) provided in the cache managing section 204-$i$ (i=1 or 2), managing the data group from which the lowest priority data item specified by the local lowest priority determining means 206-$i$ (i=1 or 2) is purged, adds the memory space, which the lowest priority data item has occupied, to the free memory space to secure enough space for caching the requested data (step B5), and stores the data therein (step B6).

Figure 9:
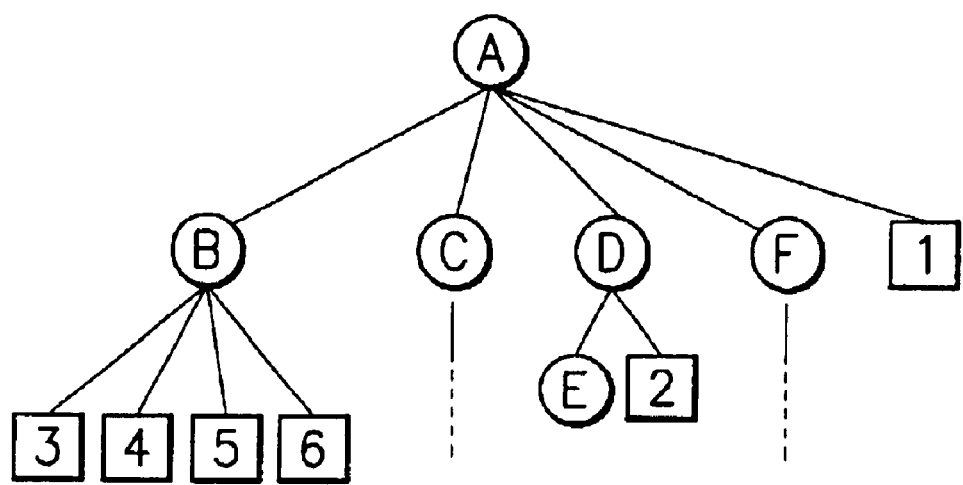
FIG. 9 is a diagram for explaining the second mode of operation illustrated in FIG. 8.

In the following, the effect of this mode of operation will be described with reference to FIG. 9. FIG. 9 shows an example of relation between the directory data A to F and the file data 1 to 6 stored in the secondary memory 220. Some of the directory data and the file data are referenced frequently, while some of them are hardly referenced for such reasons that the data are shared by plural users or the like. If frequently accessed data items are stored in the cache memory section 211 in the primary memory 210, access costs can be reduced. Assuming that four users share the directory data B and each of them has a file in the directory B, the directory B will be accessed frequently.

However, problems arise with application of a conventional caching algorithm for uniformly managing the directory data and the file data. When the directory data in the secondary memory 220 is stored in the cache memory section 211 in the primary memory 210, the speed of access to the file data is increased. On the other hand, since it is necessary to cache not only the directory data but also the file data, the memory space for caching the directory data and the memory space for caching the file data need to be balanced. As is described above, however, the directory data is likely to be accessed more frequently as compared with the file data. Consequently, when reference frequency counts of directory data and file data have changed and the counts of both the data are compared directly, the directory data which were accessed frequently before are given priority higher than that assigned to the file data which are accessed frequently at this point. As a result, when it is required to purge data stored in the cache memory section 211, the frequently accessed file data at present are purged instead of the directory data that were previously accessed frequently.

Meanwhile, in this mode of operation, the reference frequency counts are compared among the directory data and among the file data, respectively, and the reference frequency count of the directory data, which is likely to stand at a larger number, is not compared with that of the file data. When reference frequency counts of data have changed, the ordering of priorities is changed according to the reference frequency counts individually in the directory data group and the file data group. Besides, the memory spaces for caching the directory data and for caching the file data are balanced by comparing the last access times of the lowest priority data in the respective data groups. The last access time, rather than the reference frequency count, determines whether to purge the lowest priority directory data or the lowest priority file data. Thereby, the memory spaces for caching the directory data and the file data are kept well balanced, which enables appropriate caching. Thus, it is possible to improve cache hit rates for both the directory data and the file data as well as increasing the speed of file search and file I/O.

In the following, a description will be given of a variation on the second mode of operation according to the first embodiment of the present invention. In this example, the cache apparatus 200 is used as a proxy cache apparatus.

URL indicates a host that has data or a file and identifiers of the file. Since the host is related to the IP address based on DNS data, it is better to cache the DNS data in addition to file data for speeding up the operation of the proxy cache. In the case of caching the DNS data and the file data together, the DNS data of a host having a popular file is accessed more frequently as compared with the file data of the host as with the relationship between the directory data and the file data. Therefore, if the reference frequency counts of both the data are compared directly, the memory spaces for caching the DNS data and the file data cannot be balanced. With the use of the cache managing sections 204-1 and 204-2 shown in FIG. 8 for processing the DNS data and the file data, respectively, the memory spaces in the cache memory section 211 occupied by the DNS data and the file data are balanced, and thus enabling appropriate caching. Consequently, cache hit rates for the DNS data and the file data are improved, and response time for a request from a client is reduced.

While in this mode of operation, the priority of the file data and the directory data (DNS data) are compared based on the last access time, the priority of both the data may be compared by the expected next access time. The expected next access time may be calculated using the first access time B as follows: "expected access time=C+(C−B)/F". In the above expression, C represents current time and F represents reference frequency count. Accordingly, one of the local lowest priority data in respective data groups, whose expected next access time indicates the more distant future, is purged. Incidentally, the second mode of operation according to the first embodiment and the variation thereon may be applied to the second embodiment of the present invention.

In the following, the third mode of operation according to the first embodiment of the present invention will be explained. In the third mode of operation, the cache apparatus of the first embodiment is used as a proxy cache apparatus for caching WWW data.

Figure 10:
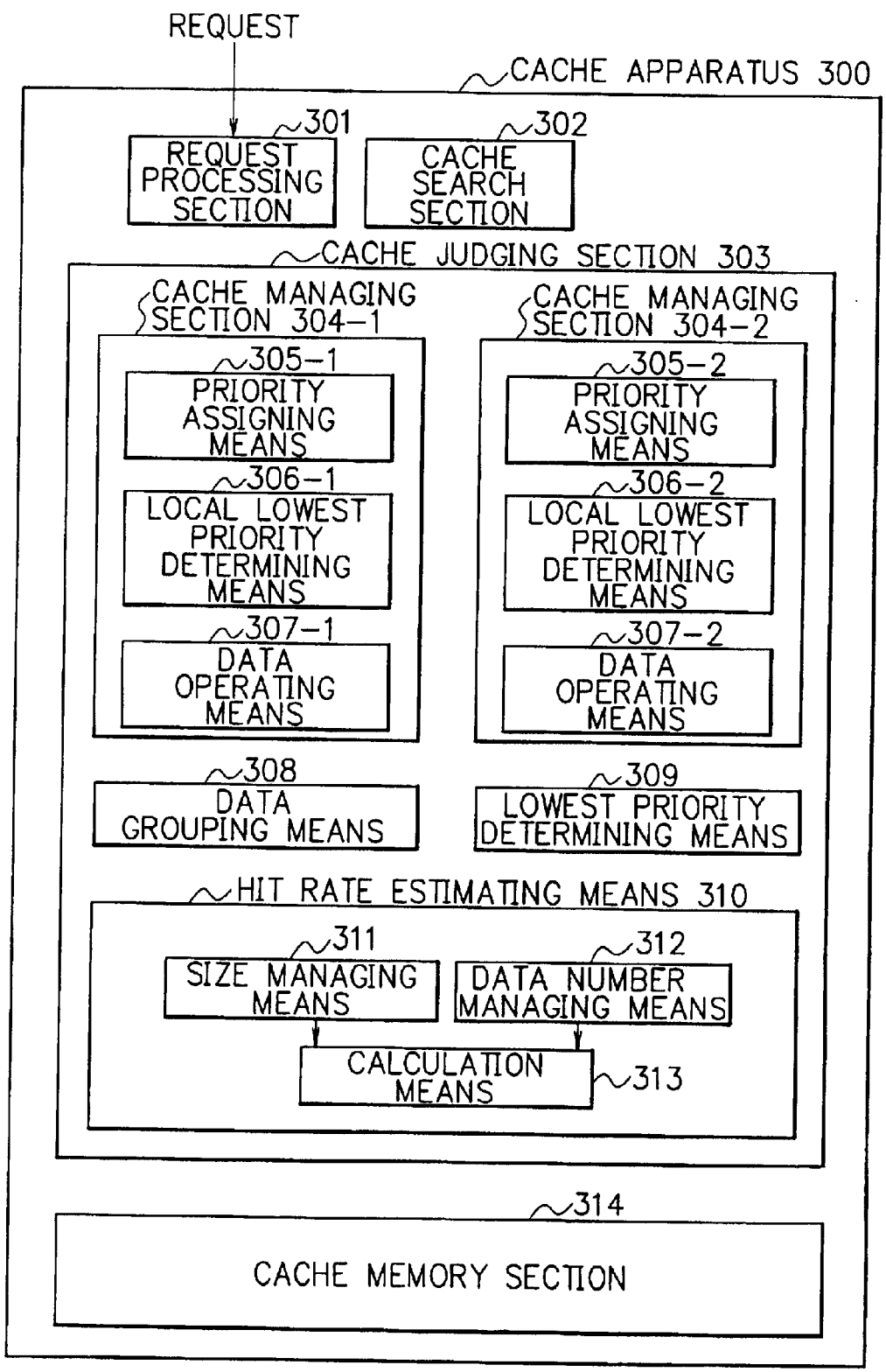
FIG. 10 is a block diagram for illustrating the third mode of operation according to the first embodiment.

FIG. 10 is a block diagram showing the configuration of a cache apparatus 300 used in the third mode of operation according to the first embodiment. The cache apparatus 300 comprises a request processing section 301, a cache search section 302, a cache judging section 303, and a cache memory section 314.

The cache judging section 303 includes a cache managing sections 304-1 and 304-2, a data grouping means 308, a lowest priority determining means 309, and a hit rate estimating means 310.

The cache managing sections 304-1 and 304-2 includes a priority assigning means 305-1 and 305-2, a local lowest priority determining means 306-1 and 306-2, and a data operating means 307-1 and 307-2, respectively. The hit rate estimating means 310 includes a size managing means 311, a data number managing means 312 and a calculation means 313.

In this mode of operation, data items stored in the cache memory section 314 are divided into a data group L for the data that has not been accessed since the data was cached and a data group H for the data that has been accessed once or more times since the data was cached. When the data belonging to the data group L in the cache memory section 314 is accessed, the data is removed from the data group L to the data group H. The cache managing sections 304-1 and 304-2 manage the data items in the data group H and data group L, respectively. The priority assigning means 305-1 and 305-2 prioritize the data items that the means 304-1 and 304-2 manage according to LRU.

The size managing means 311 manages the size |L| of memory space occupied by the data group L and the size |H| of memory space occupied by data group H. The data number managing means 312 manages the number T of data items that have been accessed once or more times and the number S of data items that have not been accessed after having moved from the data group L to the data group H. The calculation means 313 estimates values of hit rates for the data group L and the data group H based on the data managed by the size managing means 311 and the data number managing means 312.

Next, the caching operation of this mode will be explained.

When the request processing section 301 receives a request for data D from the outside (FIG. 4, step A1), the cache search section 302 finds out whether or not the data D is present in the cache memory section 314 (step A2).

If the data is present (step A2, y), the cache search section 302 reads the requested data D out of the cache memory section 314 (step A3). Besides, the priority assigning means 305-$i$, which is provided in the cache managing section 304-$i$ (i=1 or 2) that manages the data D, updates the ordering of priority for the data D according to LRU (step A4). Following the operation at step A4, the data grouping means 308 instructs the cache managing sections 304-1 and 304-2 to shift the data D from the data group L to the data group H when the data D have belonged to the data group L.

On the other hand, if the data D is not in the section 314 (step A2, n), the cache search section 302 fetches original data D from a server (step A5). Subsequently, the data grouping means 308 classifies the data D into the group L (step B1), and the priority assigning means 305-2, which is provided in the cache managing section 304-2 that manages the data group L, assigns an order of priority to the data D based on LRU (step B2).

After that, it is determined whether or not there is enough free memory space for storing the data D in the cache memory section 314 (step B3). If there is enough space, the data operating means 307-2 caches the data D in the cache memory section 314 (step B6).

If not (step B3, y), the lowest priority determining means 309 determines a data group, from which data is purged, based on the estimation of the hit rate estimating means 310 (step B4).

Further details of the operation at step B4 will be given. By use of the data |L|, |H|, S and T managed by the size managing means 311 and the data number managing means 312, the calculation means 313 provided in the hit rate estimating means 310 calculates estimative inverse numbers of hit rates SL and SH, namely, average reference intervals for the data groups L and H with following expressions (1) and (2).

$$SL=|L|/(S+a) \qquad (1)$$

$$SH=|H|/(T+a) \qquad (2)$$

In the above expression, a indicates a constant.

Then, the lowest priority determining means 309 compares the average reference interval SL of the data group L with the average reference interval SH of the data group H, and determines that the data group H has higher priority if SL$\geq$SH. Thereby, it is determined that data is purged from the data group L. On the other hand, if SL<SH, the lowest priority determining means 309 determines that the data group L has higher priority, and data is purged from the data group H.

When it is determined that data is purged from the data group H at step B4, the data operating means 307-1 provided in the cache managing section 304-1 purges the lowest priority data in the data group H from the cache memory section 314, and caches the data D in the section 314 (step B5, B6). When it is determined that data is purged from the data group L at step B4, the data operating means 307-2 provided in the cache managing section 304-2 purges the lowest priority data in the data group L from the cache memory section 314, and caches the data D in the section 314 (step B5, B6).

For example, the size managing means 311 manages the sizes |L| and |H| of the memory spaces occupied by the data groups L and H as follows. When data is purged from the data group H by the data operating means 307-1 at step B5, the size managing means 311 reduces the size |H| of the memory space for the data group H by the size of the purged data. When the data operating means 307-1 caches data at step B6, the size managing means 311 increases the size |H| of the memory space for the data group H by the size of the cached data. On the other hand, when data is purged from the data group L by the data operating means 307-2 at step B5, the size managing means 311 reduces the size |L| of the memory space for the data group L by the size of the purged data. When the data operating means 307-2 caches data at step B6, the size managing means 311 increases the size |L| of the memory space for the data group L by the size of the cached data.

Besides, the data number managing means 312 manages the numbers S and T of data items as follows. When data $\alpha$ is read out of the cache memory section 314 at step A3, the data number managing means 312 finds out whether or not a pair of an identifier and access count of the data $\alpha$ is linked to a list (not shown) provided in the means 312. If not, the data number managing means 312 adds the pair of an identifier and access count (0 time) of the data $\alpha$ to the list, and increments the number S of data items by 1. On the other hand, when the pair is linked to the list, the data number managing means 312 increments the access count paired with the identifier of the data $\alpha$ by 1, and subsequently, finds out whether or not the access count indicates 1. If the access count is 1, the data number managing means 312 increments the number T of data items by 1. If not, the means 312 does not update the number T. Additionally, when the lowest priority data $\beta$ in the data group H is purged by the data operating means 307-1, the data number managing means 312 looks up the access count paired with the identifier of the data $\beta$ linked to the list, and finds out whether or not the access count is 0. If the access count is 0, the data number managing means 312 reduces the number S of data items by 1, and removes the pair from the list. If not, the means 312 reduces the number T of data items by 1, and removes the pair from the list.

In the following, the effect of the third mode of operation according to the first embodiment will be described. The third mode of operation overcomes problems of using the conventional LRU or LFU algorithm individually by using two data groups in combination.

When, for example, a large amount of WWW data on a site is copied for mirroring, access is made to the large amount of data including data that is referenced only once.

As a result, LRU removes data that is referenced frequently from a cache, which decreases the efficiency of caching. In this mode of operation, however, data that is referenced only once is classified into the data group L, which means that the group L has lower priority than the group H. Thereby, data in the data group H, which is referenced frequently, is not purged. Thus, it is possible to use a cache efficiently.

Besides, using only LFU, even when frequently accessed data have varied in time according to changes in users' access patterns, data that was accessed frequently before is not swiftly removed from a cache, which decreases the efficiency of caching. In this mode of operation, rarely accessed data is promptly removed from the data group H even if the data was previously accessed frequently. Thereby, the problem in LFU can be solved.

Besides, in the data structure of this mode of operation, cached data may be managed in a queue just like LRU, and only O(1) computational complexity is required for one caching operation. On the other hand, in the heap data structure used by other caching algorithms such as LFU, the computation needs less time as compared with the caching algorithm requiring O(log n) computational complexity for one caching operation when the number of the data items in a cache is n.

Incidentally, application of the third mode of operation is not limited to the proxy cache used for caching WWW data. This mode of operation can be applied to the cases of caching data from a disk into a primary memory and caching DNS data in a primary memory.

In the following, a description will be given of a variation on the third mode of operation, in which the cache apparatus of the first embodiment is used as a proxy cache apparatus capable of pre-fetching data as well as caching WWW data.

In FIG. 10, the cache managing section 304-1 for managing the data group H is used for managing cached data, and the cache managing section 304-2 for managing the data group L is used for managing pre-fetched data. The data grouping means 308 classifies the pre-fetched data into the data group L, and removes data from the data group L to the data group H when the data is accessed. Both the priority assigning means 305-1 and 305-2 assign an order of priorities based on LRU.

The hit rate estimating means 310 calculates average reference intervals SL=|L|/(S+a) for the data group L and SH=|H|/(T+a) for the data group H. Then, the lowest priority determining means 309 compares the average reference intervals SL with SH, and determines that the data group H has higher priority if SL≧SH. Accordingly, it is determined that data is purged from the data group L (FIG. 4, step B4). If SL<SH, the lowest priority determining means 309 determines that the data group L has higher priority, and data is purged from the data group H.

The caching method of the third mode of operation and the variation thereon for dealing with pre-fetched data can be easily applied in combination. In this case, data items are classified into three groups: a data group P composed of pre-fetched data items, a data group L composed of data items that have not been accessed since the data items were cached, and a data group H composed of data items that have been accessed once or more times after the data items were cached. Caching operation is performed based on LRU. When a data item belonging to the group P is referenced, the data item is removed to the group L. Besides, when a data item belonging to the group L is referenced, the data item is removed to the group H. The data number managing means 312 manages the number T of data items that have been accessed once or more times after having moved to the data group H, the number S of data items that have not been accessed after having moved from the group L to the group H, the number V of data items that were removed from the group P to the group L, and the number X of data items that were cached and classified into the group L. By using the number of data items T, S, V and X, the lowest priority determining means 309 determines the data group from which a data item is purged. That is, when |P|/V is a largest value among |P|/V, |L|/S, and |H|/T, the lowest priority data item in the group P is purged. Similarly, when |L|/S or |H|/T is the largest value, the lowest priority data item in the group L or group H is purged.

Additionally, there is another way to estimate hit rates. h(t, i) for a data group i when the t-th request is received is defined as: h(t, i)=ch(t-1, i)+(1-c)Δ(t). Incidentally, c is a constant number bigger than 0 and smaller than 1, and Δ(t) is 1 when the t-th request is a request for data belonging to the data group i and otherwise Δ(t) is 0. If the size of the data group i on the receipt of the t-th request is defined by s(t, i), the hit rate is defined by h(t, i)/s(t, i). The local lowest priority data in a data group with the lowest hit rate is regarded as the lowest priority data, and thereby purged.

Hit rates for the data groups X and Y described in the first mode of operation can also be estimated by h(t, i)/s(t, i), and the local lowest priority data in a data group with the smallest h(t, i)/s(t, i) is purged.

In the following, the fourth mode of operation according to the first embodiment of the present invention will be described. In this mode of operation, the first embodiment of the present invention is applied to a cache apparatus for managing Web objects such as Web pages described in HTML (Hyper Text Markup Language) or HTML documents, images, sound, music and moving pictures embedded in the pages, and programs described in a programming language like Java.

In a HTML document, links are used to logically relate the HTML document with other HTML documents or Web objects. For example, by a description "<a href=URL>anchor </a>", the part of "anchor" in a HTML document is related to a Web object indicated by the identifier URL.

A Web page provided with many links is common in a system like the directory look-up system, in which many Web pages are first classified broadly, and then the pages are further classified more and yet more closely in a hierarchical fashion according to subject matter for users' convenience. Besides, a HTML document also contains many links in such system as offers news, in which a Web page does not carry news articles but has links to the individual news items grouped by category, and headlines of the news items are arranged on the Web page. In other words, a Web page whose value resides in their classified and arranged information generally contains many links to other Web pages. Hereinafter such Web page is referred to as an "index page".

Meanwhile, there are HTML documents which hardly contain links to other Web pages such as news pages describing events or affairs in detail, reports for some kind of techniques, or essays and diaries. Hereinafter such Web page is referred to as an "article page".

In the fourth mode of operation, the data grouping means 22 exploits the structure of HTML documents, and classifies Web pages according to the number of links on the respective pages (FIG. 4, step B1). That is, the data grouping means 22 detects links (<a href= . . . > . . . </a>) in a HTML document and classifies the document as the index page if the number of the detected links exceeds a predetermined number, or else classifies it as the article page.

Figure 11:
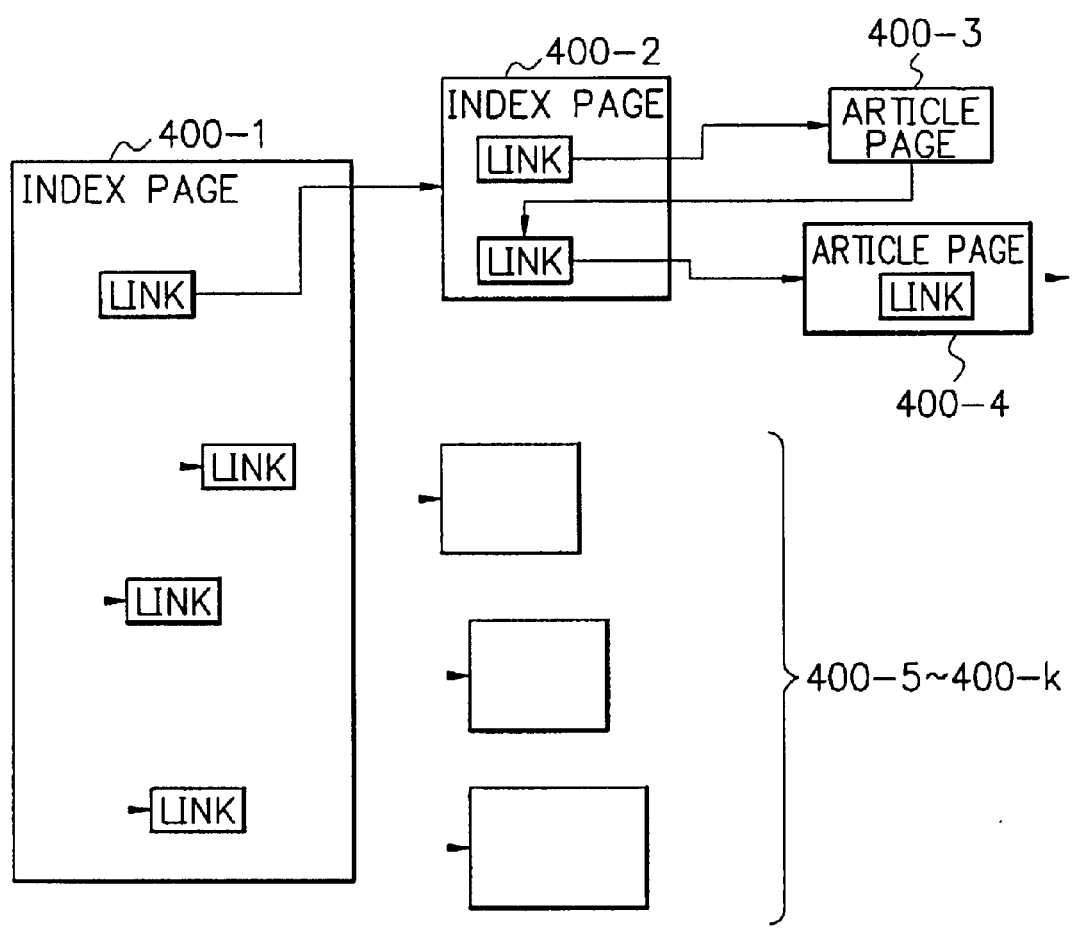
FIG. 11 is a block diagram for illustrating the fourth mode of operation according to the first embodiment.

FIG. 11 is a diagram for illustrating the fourth mode of operation according to the first embodiment. In an example of FIG. 11, a reference is first made to an index page 400-1, and therefrom to an index page 400-2, an article page 400-3, an article pages 400-4, 400-5 and so on until a Web page 400-$k$ is referenced. As can be seen in FIG. 11, when a user refers to Web pages, it is often the case that he/she refers to an index page first, and then refers to an article page by using a link on the index page. He/she might return to the index page from the article page, and refers to another article page. Namely, the user refers to the index page as a base and follows links on the page to the article pages repeatedly. Consequently, more references are made to the index page than to the article page.

In the conventional caching methods proposed previously, the above-mentioned characteristics of the index page and article page are not taken into account, and a cache has not been utilized effectively.

On the other hand, in this mode of operation, the data grouping means 22 determines whether a Web page is the index page or article page by detecting the number of links on the Web page. The cache judging section 13 is provided with the cache managing sections 21-1 for index pages and 22-2 for article pages. The respective cache managing sections deal with the index pages and article pages based on individual caching algorithms. The caching algorithm may be the one which sets priorities of pages based on the reference frequency count or the last access time such as LFU and LRU. The generally known LFU algorithm sets priorities based on the reference frequency count, and replaces the page which has been accessed the least number of times. The LRU algorithm establishes priorities based on the last access time, and the least recently referenced page, namely, a page having the smallest value of "1/(current time−last access time)" is subject to replacement. It is also possible to employ a caching algorithm having neutral characteristics between LRU and LFU, in which priorities are established based on the value derived from the expression: p*reference frequency count+(1-p)*1/(current time−last access time), using a constant p (0<p<1).

The local lowest priority determining means 32 provided in each of the cache managing sections 21-1 and 21-2 manages Web pages based on the above-mentioned caching algorithm, and determines a page with the lowest priority to be a candidate for replacement.

The lowest priority determining means 23 determines whether an index page is replaced or an article page is replaced based on a prescribed evaluation plan. For example, an evaluation value is defined as: V=1/(current time−last access time). By comparing the evaluation value Vi of the lowest priority index page with the evaluation value Va of the lowest priority article page, the page with a smaller value is decided to be replaced. It is also conceivable to determine the pages subject to replacement by comparing the value Vi with α * Va using a positive constant number α. The lowest priority page of the index pages or article pages with a smaller value is to be replaced. If α≧1, the article pages may be stored in a cache longer than the index pages. On the contrary, if α<1, the index pages may be stored in a cache longer than the article pages.

The data operating means 33 provided in the cache managing section 21-$i$ that manages the pages subject to replacement purges the lowest priority page determined to be a candidate for replacement by the local lowest priority determining means 32.

While in the above description, the data grouping means 22 classifies Web pages by the number of links, Web pages may be classified in consideration of the number of embedded objects thereon. For example, since an image, sound, music, moving picture or the like is embedded in a HTML document with a description "<IMG SRC= . . . >", the number of objects can be figured out by analyzing the <IMG SRC= . . . >tags in the document. Accordingly, a Web page can be classified as an index page or article page based on the number of links and the number of objects in the page.

Besides, Web pages may be classified into three categories as the index page, article page or embedded object considering that the embedded object has reference characters different from that of the HTML document. In both cases, each of the components but the data grouping means 22 is of the same construction and operates in the same manner as described previously for the above modes of operation.

In the fourth mode of operation, each of Web pages is classified as an index page, article page or embedded object based on its logical significance by using HTML tags in the page. Individual caching algorithms deal with the index pages, article pages and embedded objects, respectively. Web pages subject to replacement are determined by using the current time and last access time, and the least frequently referenced page of the determined pages is replaced. That is, with a strong focus on the logical structure of Web pages, known caching algorithms operate in a coordinate fashion.

Incidentally, application of the present invention is not limited to caching Web pages (HTML documents) written in HTML and Web objects such as images, sound, music, and moving pictures. The present invention is applicable to caching documents provided with hyperlinks, continuous media data including images, sound, music, moving pictures etc. or programs.

The above-described fourth mode of operation according to the first embodiment may be applied to the second embodiment.

As set forth hereinabove, in accordance with the present invention, it is possible to apply different caching algorithms to respective data groups, and therefore caching is performed in consideration of access characteristics of each data group. In addition, since the memory space is not fixedly allocated to each data group, it is possible to use the memory space efficiently even where individual caching algorithms are adopted for the respective data groups. Thus, cache hit rates can be improved.

Moreover, high hit rates can be achieved with only O(1) computational complexity as is described previously for the third mode of operation. Therefore, caching operation can be performed at low cost.

Furthermore, hyperlink structure is taken into account when caching operation is performed as is described previously for the fourth mode of operation. Consequently, with a strong focus on the logical structure of Web pages, it is possible to employ known caching algorithms in a coordinated fashion.

While the preferred embodiments of the present invention have been described using specific terms, such description is for illustrative purposes only, and it is to be understood that changes and variations may be made without departing from the spirit or the scope of the following claims.

What is claimed is:

1. A cache control method comprising the steps of:
   classifying a plurality of data items stored in a cache memory section into groups of data items each having a different access pattern;
   assigning an order of priorities to the data items with respect to each of the groups of data items according to an individual caching algorithm for the group of data items; and purging a data item, which is given the lowest priority based on the individual caching algorithm for the respective group of data items, in the lowest priority group of data items determined by prescribed evaluation standards when it is necessary to purge a data item from the cache memory section;

estimating cache hit rates of the respective groups of data items;

determining the lowest priority group of data items based on the estimated cache hit rates of the respective groups of data items; wherein the cache hit rate of each group of data items is estimated based on the size of memory space occupied by the group of data items and the number of data items which have been accessed once or more times in the group of data items.

2. The cache control method claimed in claim 1, dealing with a plurality of data items having different access frequency counts, further comprising the step of:

determining the lowest priority group by comparing the lowest priority data items in the respective groups of data items according to LRU (Least Recently Used).

3. The cache control method claimed in claim 1, dealing with a plurality of data items having different access frequency counts, further comprising the step of:

determining the lowest priority group of data items by comparing the lowest priority data items in the respective groups of data items according to LRU (Least Recently Used); and wherein the plurality of data items include a directory data and a file data.

4. The cache control method claim in claim 1, wherein data items are divided into groups of data items based on a hyperlink structure of the data items.

5. A cache control method comprising the steps of:

dividing requested data items into divided data items, which are units of cache control;

grouping the divided data items into a group of data items whose access times are predictable and a group of data items whose access times are unpredictable;

assigning an order of priorities to the divided data items with respect to each of the groups of data items according to an individual caching algorithm for the group of data items; and purging a data item, which is given the lowest priority based on the individual caching algorithm for the group of data items, in the lowest priority group of data items determined by prescribed evaluation standards when it is necessary to purge a data item from the cache memory section;

estimating cache hit rates of the respective groups of data items;

determining the lowest priority group of data items based on the estimated cache hit rates of the respective groups of data items; wherein the cache hit rate of each group of data items is estimated base on the size of memory space occupied by the group of data items and the number of data items which have been accessed once or more times in the group of data items.

6. A cache apparatus comprising:

a data grouping means for classifying a plurality of data items stored in a cache memory section into groups of data items each having a different access pattern;

a priority assigning means provided for each of the groups of data items for assigning an order of priorities to the data items belonging to the corresponding group of data items according to an individual caching algorithm for the group of data items;

a lowest priority determining means for determining the lowest priority group of data items by prescribed evaluation standards when it is necessary to purge a data item from the cache memory section; and a data operating means provided for each of the groups of data items for purging the lowest priority data item in the lowest priority group of data items determined by the lowest priority determining means;

a hit rate estimating means for estimating hit rates for the respective groups of data items; wherein the lowest priority determining means determines the lowest priority group of data items based on the estimated cache hit rates of the respective groups of data items calculated by the hit rate estimating means; and the hit rate estimating means estimates a cache hit rate of each group of data items based on the size of memory space occupied by the group of data items and the number of data items which have been accessed once or more times in the group of data items.

7. The cache apparatus claimed in claim 6, wherein:

the data grouping means divides the data items stored in the cache memory section into a plurality of groups of data items having different access frequency counts;

each of the priority assigning means assigns an order of priorities to the data items that the priority assigning means manages according to LRU (Least Recently Used); and the lowest priority determining means determines the lowest priority group of data items by comparing the lowest priority data items in the respective groups of data items.

8. The cache apparatus claimed in claim 7, which serves as a proxy cache for storing Web data.

9. The cache apparatus claimed in claim 7, which serves as a disk cache for storing disk data.

10. The cache apparatus claimed in claim 6, wherein:

the data grouping means divides the data items stored in the cache memory section into a plurality of groups of data items having different access frequency counts;

each of the priority assigning means assigns an order of priorities to the data items that the priority assigning means manages according to LRU (Least Recently Used);

the lowest priority determining means determines the lowest priority group of data items by comparing the lowest priority data items in the respective groups of data items; and the data grouping means divides the data items stored in the cache memory section into a group of directory data items and a group of file data items.

11. The cache apparatus claimed in claim 10, which serves as a proxy cache for storing Web data.

12. The cache apparatus claimed in claim 10, which serves as a disk cache for storing disk data.

13. The cache apparatus claimed in claim 6, wherein the data grouping means divides the data items into groups of data items based on a hyperlink structure of the data items.

14. The cache apparatus claimed in claim 13, which serves as a proxy cache for storing Web data.

15. The cache apparatus claimed in claim 13, which serves as a disk cache for storing disk data.

16. The cache apparatus claimed in claim 6, which serves as a proxy cache for storing Web data.

17. The cache apparatus claimed in claim 6, which serves as a disk cache for storing disk data.

* * * * *